June 2, 1936. P. WEBER 2,042,690
HEATING APPARATUS EMPLOYING CATALYTIC COMBUSTION
Filed May 31, 1935
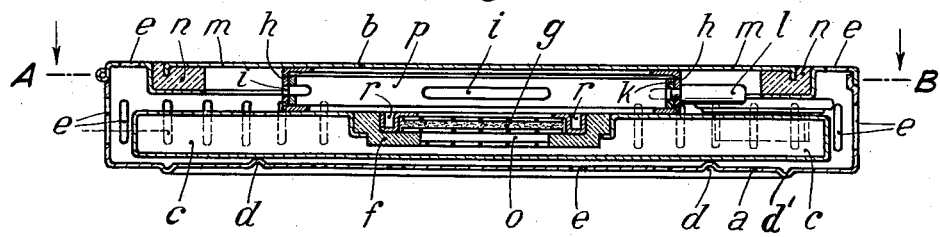
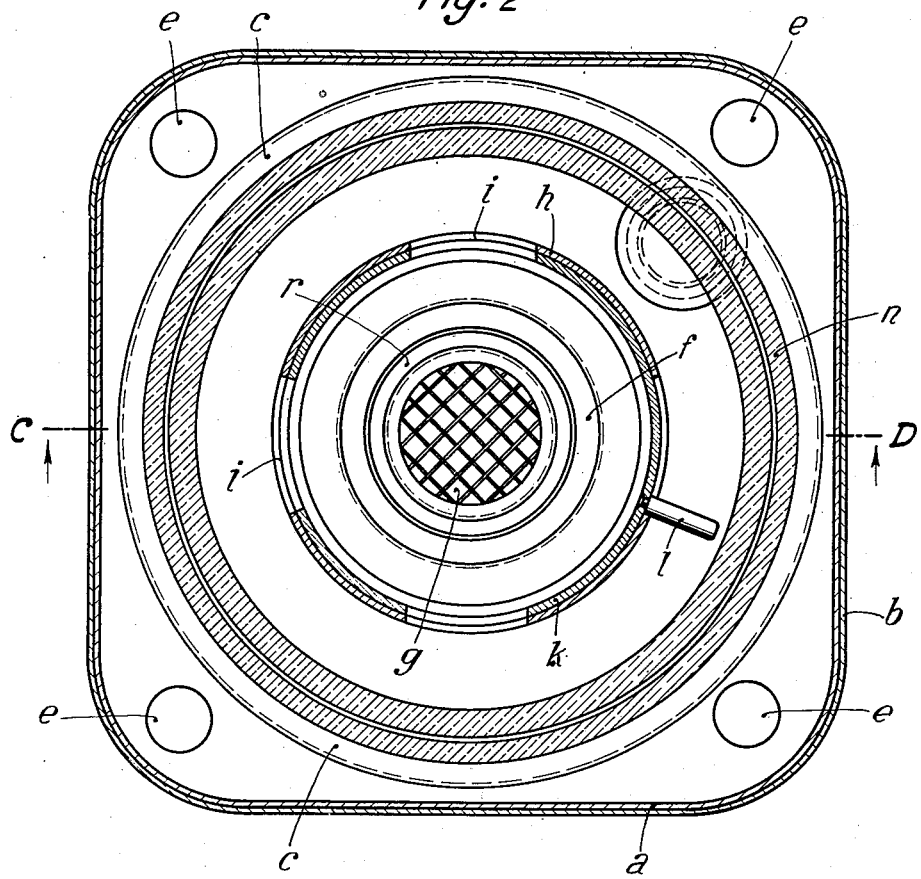
P. Weber
INVENTOR
By: Glascock Downing Seebold
Attys.

Patented June 2, 1936

2,042,690

UNITED STATES PATENT OFFICE 2,042,690

HEATING APPARATUS EMPLOYING CATALYTIC COMBUSTION

Paul Weber, Berlin-Treptow, Germany

Application May 31, 1935, Serial No. 24,425
In Germany June 15, 1934

7 Claims. (Cl. 158—96)

This invention relates to heating apparatus employing catalytic combustion.

Heating apparatus in which the heat is produced by catalytic combustion of a suitable fuel, such as alcohol, benzine or the like, are known in numerous constructional forms. It is of decisive importance for such heating apparatus that the heat content of the fuel should be utilized slowly but completely and that combustion should take place completely and without odor and is easily adapted to the heat requirements.

Known heating apparatus of this kind either permit of insufficient combustion of the fuel, or of a too vigorous combustion thereof. Both circumstances are naturally highly undesirable for reasons of economy and adaptability of such heating apparatus.

The object of the invention is to produce a new heating apparatus which does not possess the disadvantages mentioned and wherein combustion without residue takes place of so much fuel as is just necessary for the quantity of heat which is desired for the time being.

This object is achieved by the invention according to which the fuel is, so to say, sucked up by the catalyst itself, i. e., it is not evaporated under the action of external heat on the fuel container. In this case naturally the quantity of the fuel to be evaporated can never be even approximately adjusted, because it is dependent on too many circumstances, whilst the intensity of the combustion in the catalyst automatically always sucks up as much new fuel as is used. In order to make the evaporation of the fuel independent of all external circumstances it is necessary to close the fuel container as tightly as possible from the surroundings, in particular to take care that the heat developed by the combustion is not transferred to the fuel container. This is effected according to the invention by disposing the fuel container in an external casing, provided with a cover, so that it contacts with this external casing only at as few places as possible, which container may be further insulated, in order to avoid undesired heat transference. The outer container is provided with numerous apertures through which air can pass, so that a vigorous movement of air occurs around the fuel container, which maintains the fuel container always approximately at the temperature of the surroundings. A catalyst is disposed in the fuel container itself. This has the advantage of simple construction and of easily obtaining the quantity of fuel necessary for the time being.

It is just as important to introduce, and as much as possible without loss, the heat developed to the place of use, as it is to protect the fuel container from undesired heating and the unregulated evaporation of the fuel entailed thereby. This is achieved according to the invention by conducting the heat of combustion occurring in the catalyst directly to the heating surface, which, in turn is separated by insulators from the remaining parts of the apparatus.

One form of construction according to the invention is illustrated by way of example in the accompanying drawing, wherein:

Fig. 1 shows a foot warmer in sectional side elevation on the line C—D, Fig. 2;

Fig. 2 is a horizontal section on line A—B of Fig. 1.

$a$ is a casing with a cover $b$ which is movable around a hinge. A fuel container $c$ is let into this casing $a$ and has preferably as flat and thin a form as possible. The fuel container contacts with the bottom of the casing $a$ only along the corrugation or ridge $d$; intermediate insulating pieces may also be arranged on these contact places of the two adjacent walls if desired. Obviously the side surfaces should also abut against each other as little as possible. Numerous apertures $e$ are provided in the walls of the casing $a$ and of the cover $b$.

$f$ is an insulating ring formed of a material having poor thermal conductivity in which the catalytic disk $g$ is introduced. The upper surface of the fuel container $c$ and the upper surface of the insulating ring $f$ are disposed in one plane while the upper surface of the catalytic disk lies only slightly below said surfaces. $h$ is a spacer ring consisting of insulating material having apertures $i$. A second ring $k$ having a handle or lever $l$ is seated on the ring $h$ and, according to its position is adapted to open more or less, or completely close, the apertures $i$ of the ring $h$.

By this arrangement a space closed by insulating material is available for the heat radiation of the catalytic disk $g$. The heat can therefore radiate only against the central heating surface $m$ of the cover $b$ enclosed by the ring $n$. This heating surface consists of good conducting material so that the heat spreads rapidly and uniformly over the whole surface. The insulating spacing ring $n$, however, prevents this heat reaching the outer portions of the cover $b$ where it is not desired.

Through the numerous apertures $e$ fresh air is continuously made to pass over the fuel container and the latter has accordingly substantially the temperature of the atmosphere. In this way excess evaporation of the fuel is prevented. Only so much fuel is thus evaporated as the catalytic disk $g$ in the chamber $o$ is in fact able to deal with. Consequently the formation of excess pressure and the dangers connected therewith are eliminated. The regulation of the temperature is effected by the adjustment of the air inlet apertures $i$ by means of the ring $k$, as above indicated.

Now the apparatus is so dimensioned that, in case the apertures $i$ are completely closed, and thereby the entry of further air is reduced practically to a minimum, the combustion at the catalyst ceases as soon as the air present in the combustion chamber $p$ is used up and the small quantities of air which might enter through the porous spacer ring $h$ are not sufficient to permit of a proper combustion. The advantage is accordingy attained that no unburned residues of fuel appear, giving rise to undesired odor formation and the catalyst is thus preserved.

$r$ is an annular groove which serves for heating the catalyst and $d^1$ are downwardly turned ribs or corrugations adapted to form feet for supporting the device on a support so that there will be a layer of air between the device and the support.

What I claim and desire to secure by Letters Patent is:

1. A heating apparatus employing catalytic combustion comprising a casing, a fuel container located in said casing, means for preventing the ready transfer of heat from the casing to the fuel container, a catalytic disk in association with the fuel container, means for heat insulating the catalytic disk from the fuel container and means for producing a cooling current of air around the fuel container.

2. A heating apparatus employing catalytic combustion, comprising a casing, a fuel container located in said casing, means for preventing the ready transfer of heat from the casing to the fuel container, a combustion chamber formed between the fuel container and the casing, a catalytic disk in association with the fuel container, means for heat insulating the catalytic disk from the fuel container, means for admitting a predetermined amount of air into the combustion chamber and means for producing a current of cooling air around the fuel container.

3. A heating apparatus employing catalytic combustion, comprising a casing having a plurality of apertures for the admission of air, a cover for said casing, a fuel container located in said casing, means for preventing ready transfer of heat from the casing to the fuel container, a hollow spacer of insulating material, having a plurality of air apertures, disposed between the cover and the fuel container, means for adjusting the degree of opening of said air apertures, said adjusting means comprising a hand operated member, a recessed compartment formed in and depending into the fuel container, catalytic disk placed in said compartment, means for heat insulating said recessed compartment from the body of the fuel container, a combustion chamber being formed between the hollow spacer and the cover and the catalytic disk respectively.

4. A heating apparatus according to claim 3 wherein the hollow spacer comprises a ring of insulating material.

5. A heating apparatus according to claim 3 further comprising a ring of insulating material attached to said cover adapted to insulate the outer portion of the cover from the central portion thereof.

6. A heating apparatus according to claim 3 further comprising at least one up-turned rib in the bottom of the casing adapted to locate the fuel container in the casing to provide a heat insulating air space between the fuel container and the outer casing.

7. A heating apparatus employing catalytic combustion, comprising a casing having a plurality of apertures for the admission of air, a cover and heat insulating means between the central part of the cover and its outer edge, a fuel container located within said casing, means for preventing ready transfer of heat from the outer casing to the fuel container comprising a ring of insulating material having a plurality of apertures disposed between the cover and the fuel container, a second ring movably arranged about said ring of insulating material and provided with means whereby it can be turned to cover and uncover to a variable extent the apertures in the ring of insulating material, an aperture in the top of the fuel container underlying said cover and defined by a flange which extends downwardly and inwardly from the top wall of the container, a ring of insulating material carried on said flange forming a recessed compartment, a catalytic disk supported on said last mentioned ring, said rings of insulating material together with the cover, a portion of the top of the container and the catalytic disk forming a combustion chamber.

PAUL WEBER.